United States Patent [19]
Katori et al.

[11] Patent Number: 5,182,690
[45] Date of Patent: Jan. 26, 1993

[54] FE-N-BASED SOFT MAGNETIC THIN FILMS AND MAGNETIC HEADS USING SUCH FILMS

[75] Inventors: Kenji Katori; Masatoshi Hayakawa; Koichi Aso; Kazuhiko Hayashi, all of Kanagawa; Kazuo Kajiwara, Tokyo, all of Japan

[73] Assignee: Sony Corporation, Tokyo, Japan

[21] Appl. No.: 636,072

[22] Filed: Dec. 28, 1990

[30] Foreign Application Priority Data

Dec. 29, 1989 [JP] Japan ................. 1-342953
Feb. 27, 1990 [JP] Japan ................. 2-46322

[51] Int. Cl.5 ............................... G11B 5/235
[52] U.S. Cl. .................................... 360/120
[58] Field of Search ............... 360/120, 125, 126; 428/172, 213, 214, 215, 332, 336, 457, 694, 702, 900

[56] References Cited

FOREIGN PATENT DOCUMENTS 0125891 11/1984 European Pat. Off. .
0299480 1/1989 European Pat. Off. .
3927342 2/1990 Fed. Rep. of Germany .

OTHER PUBLICATIONS

Arai et al., "Magnetic Properties of Fe-Si Thin Films Sputtered in Mixed Gas Atmospheres", *IEEE Transactions on Magnetics*, vol. 25, No. 5, Sep. 1989, pp. 3976-3978.
*Patent Abstracts of Japan*, vol. 13, No. 132 (E-736) [3480], Mar. 31, 1989 for Japanese Published Application of Dec. 6, 1988.
*Patent Abstracts of Japan*, vol. 13, No. 338 (E-795) [3686], Jul. 28, 1989 for Japanese Published Application 1-99203 of Apr. 18, 1989.

*Primary Examiner*—A. J. Heinz
*Attorney, Agent, or Firm*—Hill, Van Santen, Steadman & Simpson

[57] ABSTRACT

Additive elements are added to Fe-N soft magnetic thin films along with oxygen, so that the thermal stability is remarkably improved. After annealing treatment at approximately 550° C., it is possible to provide an Fe-N soft magnetic thin film with a low coercive force. Similarly, it is also possible to provide a soft magnetic thin film having a low coercive force by introducing a combination of specific types of additive elements to Fe-N soft magnetic thin films. When oxygen is further added to the film, it is also possible to provide a soft magnetic thin film which has very excellent soft magnetic characteristics and good thermal stability. The soft magnetic thin films of the invention have good soft magnetic characteristics, a high saturation magnetic flux density and good thermal stability. A magnetic head of a metal-in-gap type using the soft magnetic thin film is also described.

8 Claims, 11 Drawing Sheets

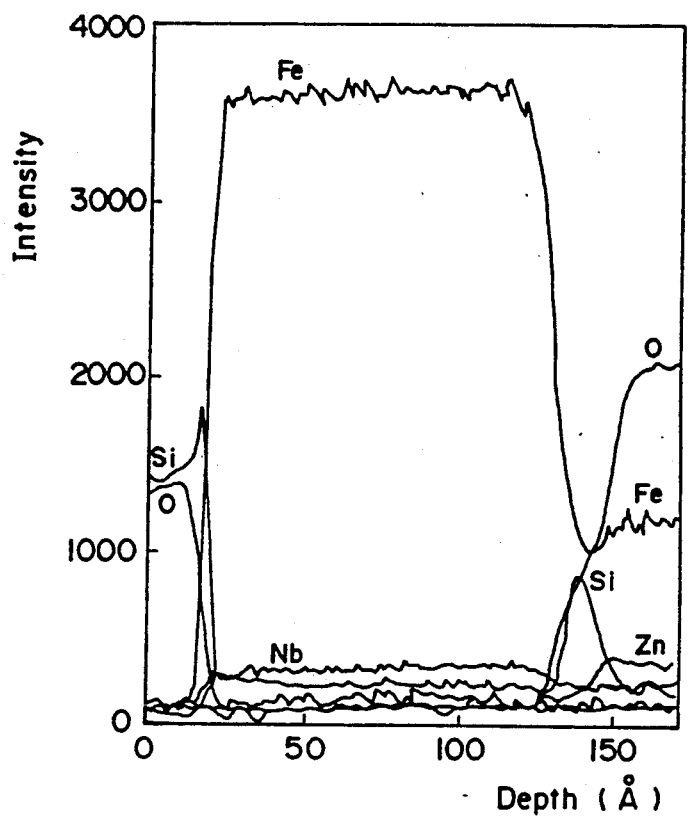
FIG. IIA
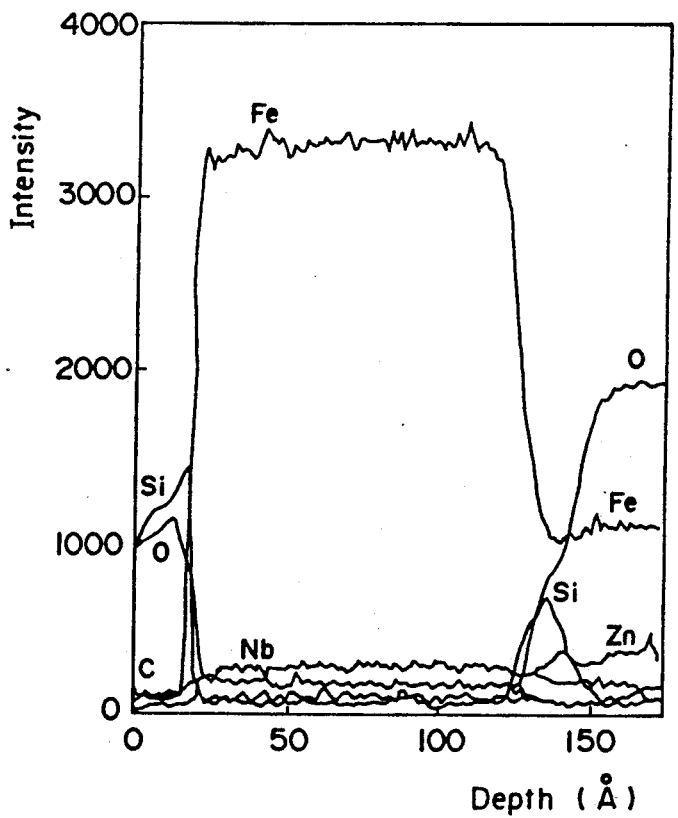
FIG. IIB

FE-N-BASED SOFT MAGNETIC THIN FILMS AND MAGNETIC HEADS USING SUCH FILMS

BACKGROUND OF THE INVENTION

1. Field of the Invention

This invention relates to an Fe-N soft magnetic thin film and more particularly, to an improvement in its heat resistance. The invention also relates to magnetic head using such a magnetic thin film as mentioned above.

2. Description of the Prior Art

In the field of magnetic recording, there is a great tendency toward high density recording or recording at short wavelengths, which requires magnetic recording mediums to have a high coercive force and a high residual magnetic flux density. On the other hand, materials for a magnetic head are required to have a high saturation magnetic flux density, a high magnetic permeability and a low coercive force in order to make the best use of the characteristics of the magnetic recording medium.

As one of soft magnetic materials which satisfy such requirements, there are hitherto known Fe-N materials. In fact, studies have been made to utilize, as a core of a magnetic head, the material as a thin film which is formed by a vapor phase plating technique such as sputtering.

However, the Fe-N-based soft magnetic thin film has the drawback that the thermal stability is poor. In the fabrication process of the magnetic head, it is essential to conduct a fusing step using high melting glass in order to ensure reliability. This step needs thermal treatment at high temperatures, so that the above drawback becomes serious.

Under these circumstances, studies have been continued with respect to an improvement of the thermal stability of the Fe-N-based soft magnetic thin film. For instance, the present applicant discloses in Japanese Laid-open Patent Application No. 63-299219 Fe-N-based soft magnetic thin films in which a small amount of a third element is incorporated to improve the thermal stability.

The melting point of glass used for fusion during the course of fabrication of a magnetic head should preferably be as high as possible for the purpose of ensuring the reliability. For instance, with a bulk-type magnetic head, a glass fusion step using approximately 550° C. is usually adopted. Accordingly, where a soft magnetic thin film is applied as a core material, a glass fusion step at approximately 550° C. is necessary. Materials for the thin film should have good soft magnetic characteristics and a high saturation magnetic flux density after the thermal treatment at such temperatures as indicated above.

SUMMARY OF THE INVENTION

It is accordingly an object of the present invention to provide an Fe-N soft magnetic thin film which is improved in thermal stability and has good soft magnetic characteristics and a high saturation magnetic flux density after a glass fusion step at approximately 550° C.

It is another object of the invention to provide an Fe-N soft magnetic thin film in which additive elements are added to the Fe-N material along with oxygen or in a specific combination of the additive elements, whereby the thermal stability is improved along with high saturation magnetic flux density and low coercive force.

According to one embodiment of the invention, there is provided a soft magnetic thin film which consists essentially of a composition of the formula,

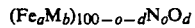

$$(Fe_aM_b)_{100-o-d}N_oO_d$$

wherein M represents at least one element selected from the group consisting of Si, Al, Ta, B, Mg, Ca, Sr, Ba, Cr, Mn, Zr, Nb, Ti, Mo, V, W, Hf, Ga, Ge and rare earth elements, and a, b, c and d are, respectively, values by atomic % and are defined such that $0.1 \leq b \leq 5$, $a+b=100$, $0.5 \leq c \leq 15$ and $0.1 \leq d \leq 13$.

According to another embodiment of the invention, there is also provided a soft magnetic thin film which consists essentially of a composition of the formula,

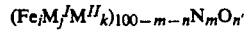

$$(Fe_iM^I_jM^{II}_k)_{100-m-n}N_mO_n$$

wherein $M^I$ represents at least one element selected from the group consisting of Al, Ga, Ti and rare earth elements, and $M^{II}$ represents at least one element selected from the group consisting of Nb, Ta, V, Zr and Hf, and i, j, k, m and n are, respectively, values by atomic % and are defined such that $0.1 \leq j \leq 2.5$, $0.1 \leq k \leq 2.5$, $i+j+k=100$, $0.5 \leq m \leq 15$, and $0.1 \leq n \leq 13$.

The magnetic head using the soft magnetic films of the above embodiments is also provided according to the invention. The magnetic head is of the type which comprises a pair of magnetic core halves which are abutted to each other, each of the core halves including a magnetic ferrite block and a magnetic thin film of the type defined above which is provided on the ferrite block, the magnetic thin films formed on the respective ferrite blocks being in face-to-face and spaced relation with each other to establish a magnetic gap therebetween.

BRIEF DESCRIPTION OF THE DRAWINGS

FIGS. 7(A) and 7(B) are, respectively, characteristic graphs showing the variation in compositional profile in relation to the thermal treatment in case where a $SiO_2$ film is provided between the soft magnetic thin film and the fusing glass wherein

FIGS. 8(A) and 8(B) are, respectively, characteristic graphs showing the variation in compositional profile in relation to the thermal treatment in case where SiO$_2$ film+Cr film (thickness 100 angstroms) are provided between the soft magnetic thin film and the fusing glass wherein FIG. 8(A) is prior to the thermal treatment and FIG. 8(B) is after the thermal treatment;

FIGS. 9(A) and 9(B) are, respectively, characteristic graphs showing the variation in compositional profile in relation to the thermal treatment in case where SiO$_2$ film+Cr film (thickness 500 angstroms) are provided between the soft magnetic thin film and the fusing glass wherein FIG. 9(A) is prior to the thermal treatment and FIG. 9(B) is after the thermal treatment;

FIGS. 10(A) and 10(B) are, respectively, characteristic graphs showing the variation in compositional profile in relation to the thermal treatment in case where a fusing glass is formed directly on a soft magnetic thin film wherein

FIGS. 11(A) and 11(B) are, respectively, characteristic graphs showing the variation in compositional profile in relation to the thermal treatment in case where a SiO$_2$ film is provided between the ferrite core and the soft magnetic thin film wherein FIG. 11(A) is prior to the thermal treatment and FIG. 11(B) is after the thermal treatment;

FIGS. 12(A) and 12(B) are, respectively, characteristic graphs showing the variation in compositional profile in relation to the thermal treatment in case where the soft magnetic thin film is directly formed on the ferrite core wherein FIG. 12(A) is prior to the thermal treatment and FIG. 12(B) is after the thermal treatment.

DESCRIPTION OF THE PREFERRED EMBODIMENTS

The respective compositions for the soft magnetic thin film set out above have been determined in consideration of soft magnetic characteristics and a saturation magnetic flux density. Especially, when oxygen is used, its content should be in the range of 0.1 to 13 atomic %. The improvement in the thermal stability cannot be expected when the content of oxygen is either smaller or larger, e.g. the coercive force Hc after annealing becomes great.

When, among the additive elements, at least one of Al, Ga, Ti and rare earth elements and at least one of Nb, Ta, V, Zr and Hf are used in combination, the thermal stability is also improved. In this case, part of Fe is preferably substituted with these elements at a rate of 0.1 to 2.5 atomic %. If either of the elements is used in smaller amounts of the substitution, the meaning of the combination is lost, so that an intended effect will not be expected. On the contrary, when both types of elements are used in larger amounts of the substitution, the rate of Fe is relatively reduced, with the fear that the soft magnetic characteristics and the saturation magnetic flux density are adversely influenced.

The soft magnetic thin films are formed by thin film formation techniques such as sputtering. The additive elements may be added as follows: an alloy of intended elements and Fe is initially prepared and is used as a target or evaporation source. Alternatively, chips of the respective elements are placed on an Fe target for simultaneous sputtering.

Nitrogen and oxygen may be incorporated by a method wherein nitrides and oxides are used as targets and vacuum deposition sources. Usually, such incorporation is achieved by introducing nitrogen and oxygen in an atmosphere.

The soft magnetic thin films to which the invention is directed may be either a single-layered film or a multi-layered film having such a built-up structure wherein the films are separated by means of a magnetic metal such as Permalloy, a non-magnetic metal such as Ag, Cu or the like, or a ceramic material such as Si-N, SiO$_2$ or the like.

Figure 13A:
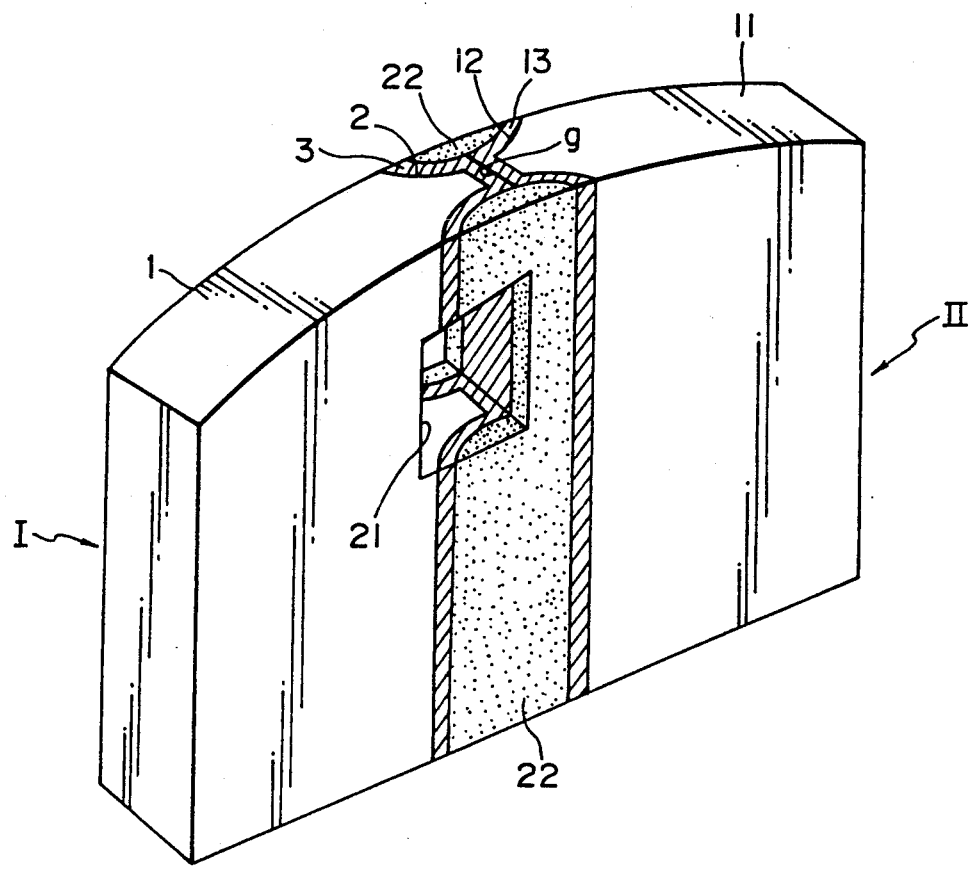
FIGS. 13(A) and 13(B) are, respectively, a schematic perspective view of a magnetic head of the so-called metal-in-gap type using a soft magnetic film according to the invention and an enlarged plan view of an essential part which slidingly contacted with a magnetic recording medium.

The soft magnetic thin films may be used as a magnetic head of a so-called metal-in-gap type. This type of magnetic head is particularly described in FIGS. 13(A) and 13(B). In these figures, there is shown a magnetic head which includes magnetic core portions 1, 11 made, for example, of a magnetic oxide material such as Mn-Zn ferrite. In the vicinity of the abutting faces of the core halves 1, 11, track width-regulating grooves 2, 12 are provided to break away at opposite sides of the core substantially in the form of an arc as shown in FIG. 13(A). Soft magnetic thin films 3, 13 of the invention are deposited at the abutting faces of the respective magnetic core portions 1, 11 including the track width regulating grooves 2, 12. Each film is formed to extend from a front gap forming face to a rear gap forming face as shown, thereby forming a pair of magnetic core halves I, II.

Figure 13B:
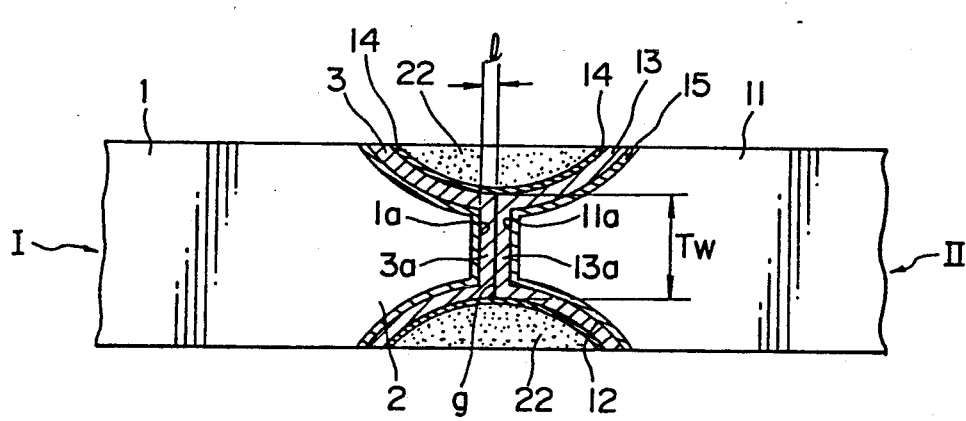

When flat portions 3a, 13a of the core halves I, II where the soft magnetic thin films 3, 13 are formed are abutted to each other, there is formed magnetic gap, g, with a length of Tw shown in FIG. 13(B).

In general, these magnetic core halves are integrally bonded by fusion of glass to constitute the magnetic head.

At that time, there may arise a problem of the reaction between the soft magnetic thin films of the invention and the glass or between the soft magnetic thin films and the ferrite by heat generation during the fusion of glass.

Accordingly, when the soft magnetic thin film of the invention is applied to the magnetic head of the metal-in-gap type, it is preferred to provide very thin films 4, 14 of silicon oxide or silicon nitride between glass 22 and the soft magnetic thin films 3, 13 or between core portions or ferrite blocks 1, 11 and the soft magnetic thin films 3, 13, as a reaction inhibiting film. In particular, the reaction-inhibiting films 4, 14 provided between the glass 22 and the soft magnetic thin films 3, 13 should preferably be built-up films with a silicon oxide film or a silicon nitride film and a metallic chromium film or a chromium compound film.

The silicon oxide film or silicon nitride film is also formed by thin film formation techniques such as sputtering. The film thickness is preferably in the range of 30 to 100 angstroms for the reaction inhibiting film provided between the ferrite block and the soft magnetic thin film. If the reaction inhibiting film has a thickness of less than 30 angstroms, the reaction cannot be suppressed to a full extent. On the contrary, over 100 angstroms, it may serves as a quasi-gap. For the reaction inhibiting film provided between the glass and the soft magnetic thin film, the thickness is preferably in the range of 30 to 500 angstroms. If the thickness is less than 30 angstroms, the reaction cannot be satisfactorily suppressed. The upper limit is not critical but a thickness of not larger than 500 angstroms is preferred in view of the productivity. The metallic chromium film or chromium compound film is provided for the purpose of ensuring bonding strength with glass and is formed by thin film formation techniques such as sputtering. The thickness is preferably in the range of 30 to 500 angstroms for the same reason as with the silicon oxide film or silicon nitride film.

The present invention is described by way of examples.

EXAMPLE 1

This example illustrates incorporation of additive elements and oxygen in Fe-N soft magnetic thin films.

Initially, targets consisting of Fe-Al alloys and Fe-Nb alloys were, respectively, prepared and subjected to RF sputtering in an atmosphere of argon containing nitrogen gas and oxygen gas to make thin films having compositions indicated in Table 1.

The sputtering conditions included an output of 300 W and a gas pressure (total pressure) of 1.2 mTorr., and the thickness of the respective thin films was 3 μm.

Figure 1:
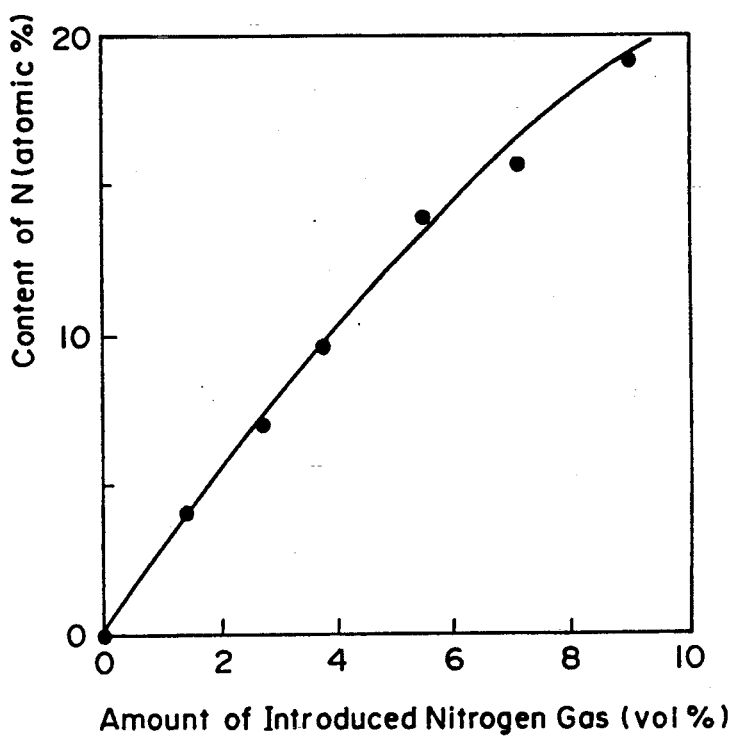
FIG. 1 is a characteristic graph showing the relation between the amount of nitrogen introduced into a sputtering atmosphere and the content of nitrogen in the resulting film.
Figure 2:
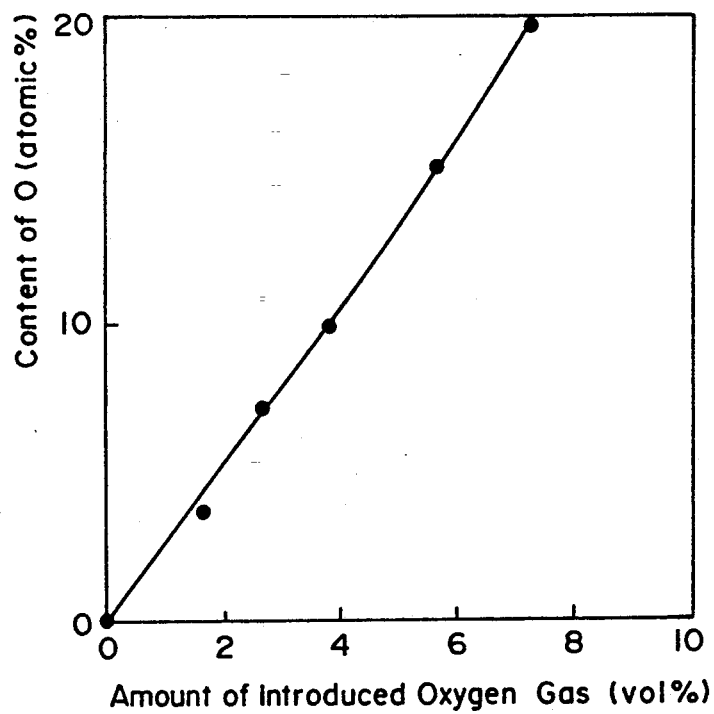
FIG. 2 is a characteristic graph showing the relation between the amount of oxygen introduced into a sputtering atmosphere and the content of oxygen in the resulting film.

The contents of nitrogen and oxygen in the films were controlled by controlling amounts of nitrogen and oxygen supplied to the atmosphere. FIG. 1 shows the relation between the content of nitrogen gas in the sputtering atmosphere and the content of nitrogen in the film and FIG. 2 shows the relation between the content of oxygen in the sputtering atmosphere and the content of oxygen in the film. As will be seen from these figures, the control in the contents of nitrogen and oxygen can change the contents of nitrogen and oxygen in the films substantially in proportional relation.

The content of nitrogen or oxygen in the respective films was measured according to an inert gas fusion method. More particularly, a sample obtained by subjecting a Ni substrate (10 mm × 20 mm × 3 mm, weight of about 0.5 g) to vacuum evaporation (sputtering) was placed in a graphite crucible and heated in an impulse furnace at 2500° C. The oxygen reacts with carbon and is converted into carbon monoxide, and the nitrogen is extracted as it is. Subsequently, the extracted gas is entrained with a helium carrier gas and the carbon monoxide is converted with copper oxide into carbon dioxide. The nitrogen and the carbon dioxide are chromatographically separated by means of a separation tube, followed by detection with a thermal conductivity detector and calculation from the following equation:

$$D (\%) = \frac{A \times (C - \text{blank})}{B \times 10^4}$$

A: weight after the deposition (Ni+film)
B: weight of the deposition (film)
C: content of N or O in the deposited film (Ni+film)
D: content of N or O in the amount of the deposition (film).

The respective samples were annealed at 550° C. for 1 hour, after which they were subjected to measurement of coercive force, Hc. The results are shown in Table 1.

TABLE 1

| | Composition | Coercive Force (Oe) |
|---|---|---|
| Example: | | |
| I | $(Fe_{98.8}Al_{1.2})_{92}N_6O_2$ | 2.0 |
| II | $(Fe_{97.4}Al_{2.6})_{92}N_6O_2$ | 1.8 |

TABLE 1-continued

| | Composition | Coercive Force (Oe) |
|---|---|---|
| III | $(Fe_{98.6}Nb_{1.4})_{92}N_6O_2$ | 1.7 |
| IV | $(Fe_{97.5}Nb_{2.5})_{92}N_6O_2$ | 0.9 |
| Comparative Example: | | |
| V | $(Fe_{98.8}Al_{1.2})_{94}N_6$ | 2.5 |
| VI | $(Fe_{98.6}Nb_{1.4})_{94}N_6$ | 2.1 |
| VII | $Fe_{92}N_6O_2$ | 20 |

As will be apparent from comparison between samples I and V or samples III and VI, the coercive force after the annealing is lowered by incorporation of oxygen. However, if oxygen alone is added without further incorporation of any additive element, good soft magnetic characteristics after the thermal treatment cannot be expected as shown in sample VII.

EXAMPLE 2

This example illustrates addition of specific types of elements in combination along with oxygen.

The sputtering conditions as used in Example 1 were used in this example and sputtering was performed in an atmosphere of argon containing nitrogen gas and oxygen gas to obtain samples.

Figure 3:
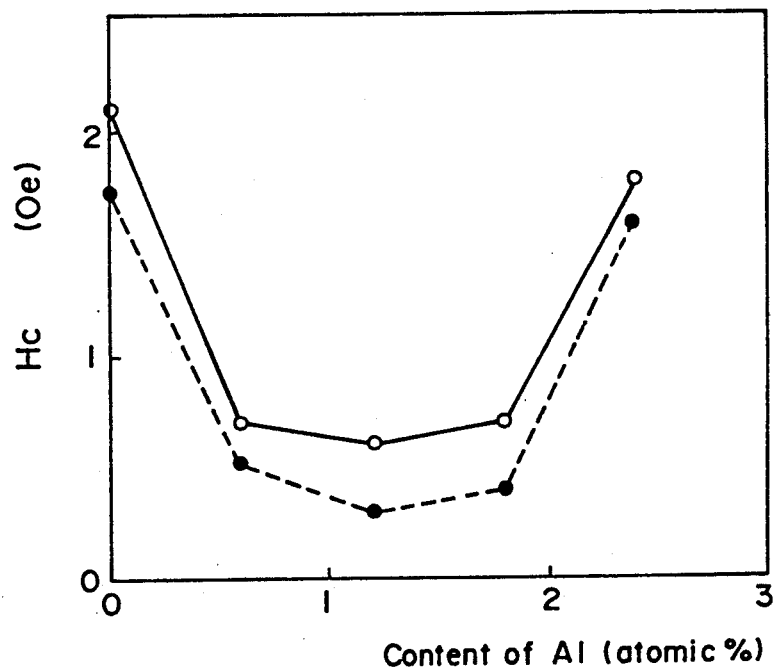
FIG. 3 is a characteristic graph showing the variation in coercive force in relation to the amount of Al in case where nitrogen and oxygen are added and Al and Nb are added at the same time.

FIG. 3 shows the relation between the amount, x, of Al in samples to which Nb and Al were simultaneously added and the coercive force, Hc, (value after annealing at 550° C.), wherein the circle is a case free of any oxygen and the solid circle is a case containing oxygen. The compositional formulas of the respective cases are as follows.

$(Fe_{98.6-x}Al_xNb_{1.4})_{94}N_6$ $(Fe_{98.6-x}Al_xNb_{1.4})_{92}N_6O_2$

Figure 4:
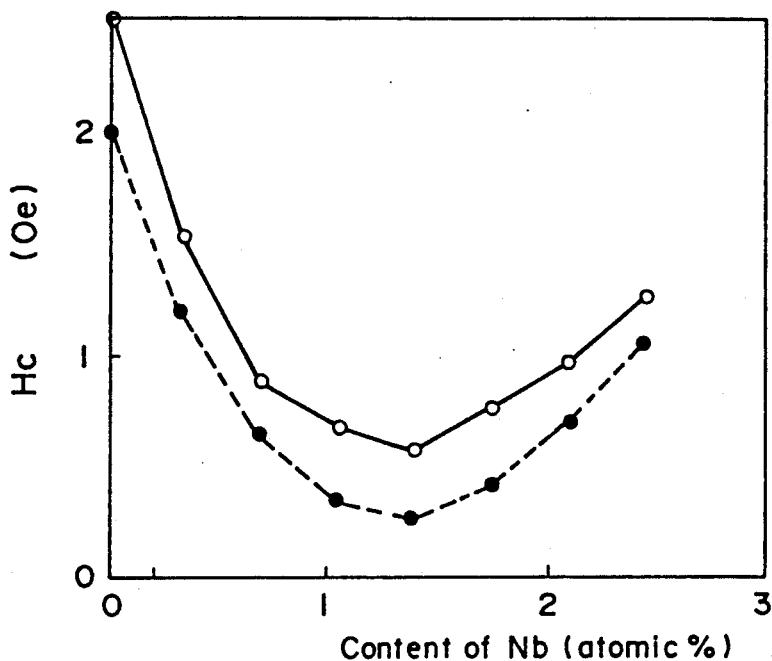
FIG. 4 is a characteristic graph showing the variation in coercive force in relation to the amount of Nb.

FIG. 4 shows the relation between the amount, x, of Nb in samples to which Nb and Al were simultaneously added and the coercive force, Hc, (value after annealing at 550° C.), wherein the circle is a case free of any oxygen and the solid circle is a case containing oxygen. The compositional formulas of the respective cases are as follows.

$(Fe_{98.8-x}Al_{1.2}Nb_x)_{94}N_6$ $(Fe_{98.8-x}Al_{1.2}Nb_x)_{92}N_6O_2$

As will be apparent from these figures, the addition of both Al and Nb is effective. Especially, when oxygen is added, the coercive force is generally low.

When Al was replaced by Ti or a rare earth element or when Nb was replaced by Ta, V, Zr or Hf, similar soft magnetic characteristics were obtained.

Figure 5:
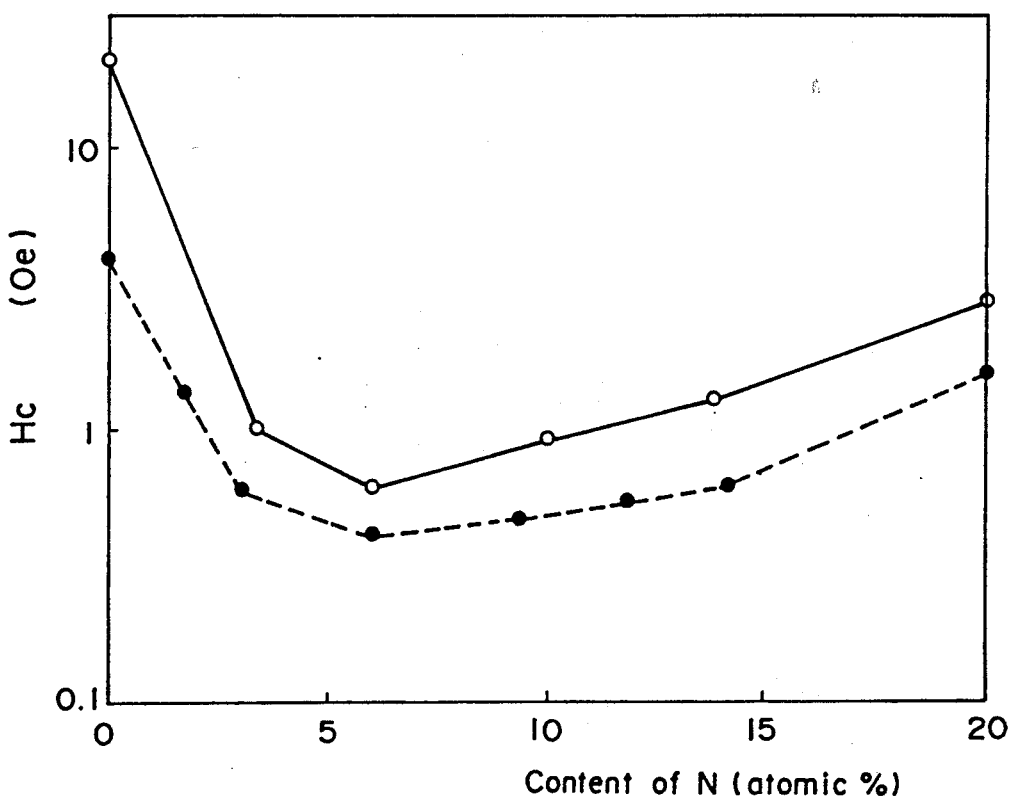
FIG. 5 is a characteristic graph showing the variation in coercive force in relation to the amount of nitrogen.
Figure 6:
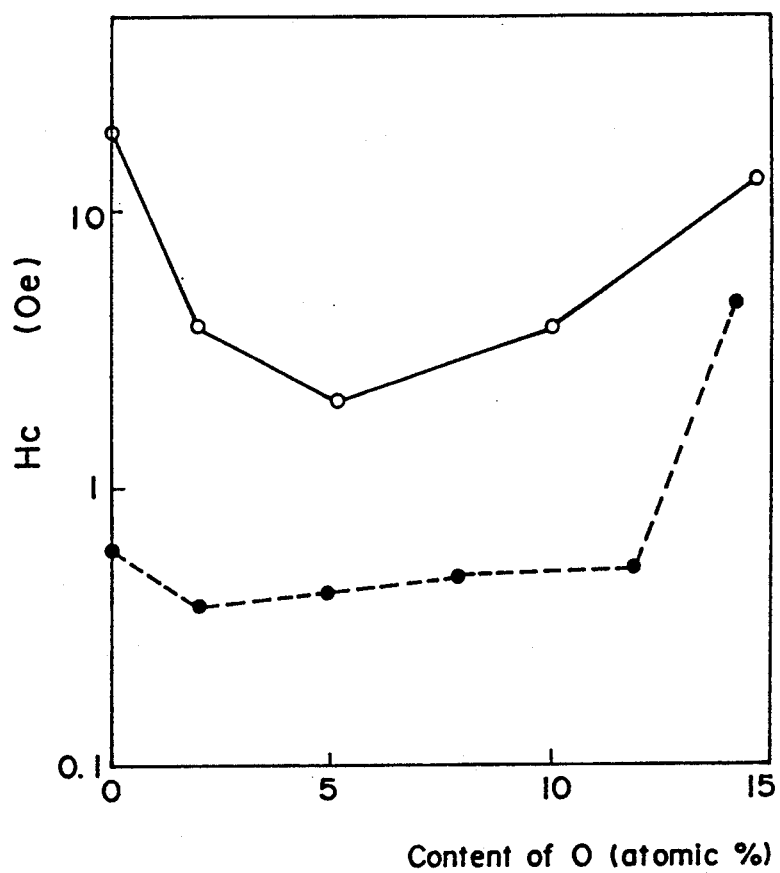
FIG. 6 is a characteristic graph showing the variation in coercive force in relation to the amount of oxygen.

FIG. 5 shows the relation between the content of nitrogen and the coercive force after the annealing, and FIG. 6 shows the relation between the content of oxygen and the coercive force after the annealing. In either case, the metal composition was fixed at $Fe_{97.4}Al_{1.2}Nb_{1.4}$. In FIG. 5, a solid line connecting circles indicates the case where nitrogen alone was added and a broken line connecting solid circles is the case where nitrogen and oxygen (2 atomic %) were added. In FIG. 6, a line connecting circles is the case where oxygen alone was added and a broken line connecting solid circles is the case where nitrogen (6 atomic %) and oxygen were introduced.

From these FIGS. 5 and 6, it will be apparent that the addition of nitrogen or oxygen influences the soft magnetic characteristics and that when both nitrogen and oxygen are added, a low coercive force can be achieved.

Typical samples were subjected to measurement of the soft magnetic characteristic (coercive force after annealing at 550° C. for 1 hour) and a saturation magnetic flux density, Bs. The results are shown in Table 2.

TABLE 2

| | Composition | Hc (Oe) | Bs (kG) |
|---|---|---|---|
| i | $(Fe_{97.4}Al_{1.2}Nb_{1.4})_{92}N_6O_2$ | 0.3 | 19 |
| ii | $(Fe_{97.5}Ga_{1.1}Nb_{1.4})_{92}N_6O_2$ | 0.4 | 19 |
| iii | $(Fe_{97.6}Ti_{1.0}Nb_{1.4})_{92}N_6O_2$ | 0.3 | 19 |
| iv | $(Fe_{97.8}Y_{0.8}Nb_{1.4})_{92}N_6O_2$ | 0.3 | 19 |
| v | $(Fe_{98.1}Sm_{0.5}Nb_{1.4})_{92}N_6O_2$ | 0.4 | 19 |
| vi | $(Fe_{97.4}Al_{1.2}Ta_{1.4})_{92}N_6O_2$ | 0.4 | 19 |
| vii | $(Fe_{98.2}Al_{1.1}V_{0.7})_{92}N_6O_2$ | 0.4 | 19 |
| viii | $(Fe_{97.5}Al_{1.1}Zr_{1.4})_{92}N_6O_2$ | 0.5 | 19 |
| ix | $(Fe_{97.5}Al_{1.1}Hf_{1.4})_{92}N_6O_2$ | 0.6 | 19 |

All the samples exhibited very good soft magnetic characteristics with high saturation magnetic flux density values.

The sample i was used as a main magnetic film for formation of multi-layered films, followed by determination of a soft magnetic characteristic. In Table 3, there are shown a thickness of the main magnetic film of the respective samples, the type and thickness of intermediate layer, the total thickness and the coercive force, Hc, of the samples after annealed at 550° C. for 1 hour.

TABLE 3

| Thickness of Main Magnetic Film (A) | Intermediate Layer | | Total Thickness | Coercive Force Hc (Oe) |
|---|---|---|---|---|
| | Type | Thickness | | |
| a | 500 | SiO$_2$ | 10 angstroms | 3 μm | 0.1 |
| b | 1000 | SiO$_2$ | 10 angstroms | 3 μm | 0.2 |
| c | 500 | Si—N | 10 angstroms | 3 μm | 0.1 |
| d | 500 | Co—Zr amorphous | 20 angstroms | 3 μm | 0.2 |

With the built-up films, very good soft magnetic characteristics are obtained.

APPLICATION EXAMPLE 1

In this example, taking the application to a metal-in-gap type magnetic head into consideration, an interfacial reaction between the soft magnetic thin film to which the invention is applied and a fusion glass was determined.

The composition of the soft magnetic thin film used was of the following formula

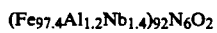

$(Fe_{97.4}Al_{1.2}Nb_{1.4})_{92}N_6O_2$ (sample i in Table 2).

The soft magnetic thin film having the above-indicated composition was formed by sputtering on a Mn-Zn ferrite core, after which a reaction inhibiting film consisting of SiO$_2$ film or SiO$_2$ undercoat film+Cr film was formed. On the reaction inhibiting film was formed a film of a fusing glass material by sputtering, followed by thermal treatment at 560° C. for 1 hour and checking how the reaction proceeds according to the Auger electron spectroscopy.

For comparison, a fusing glass material was directly formed on the soft magnetic thin film by sputtering and thermally heated at 560° C. for 1 hour to check how the reaction proceeds.

Figure 7A:
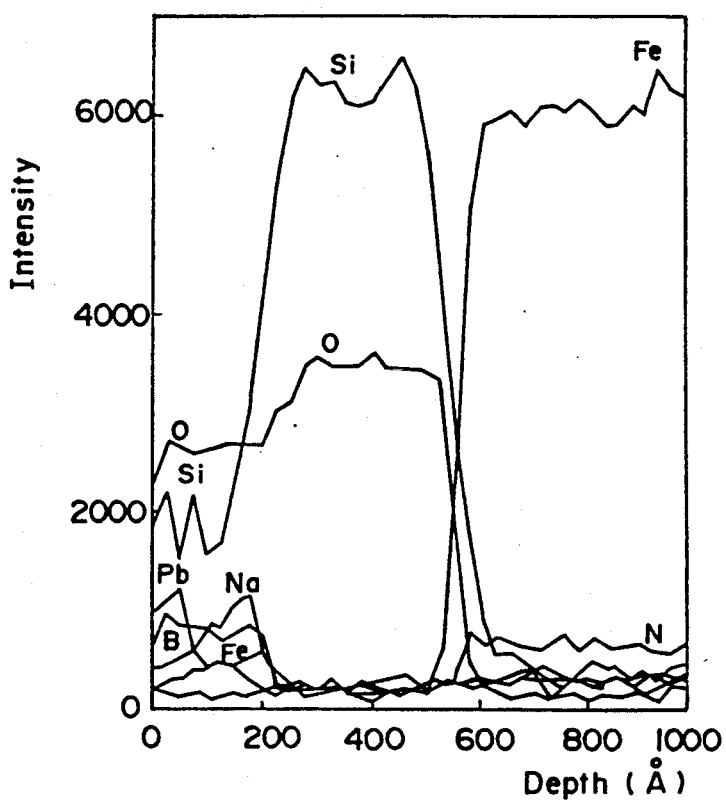
Figure 7B:
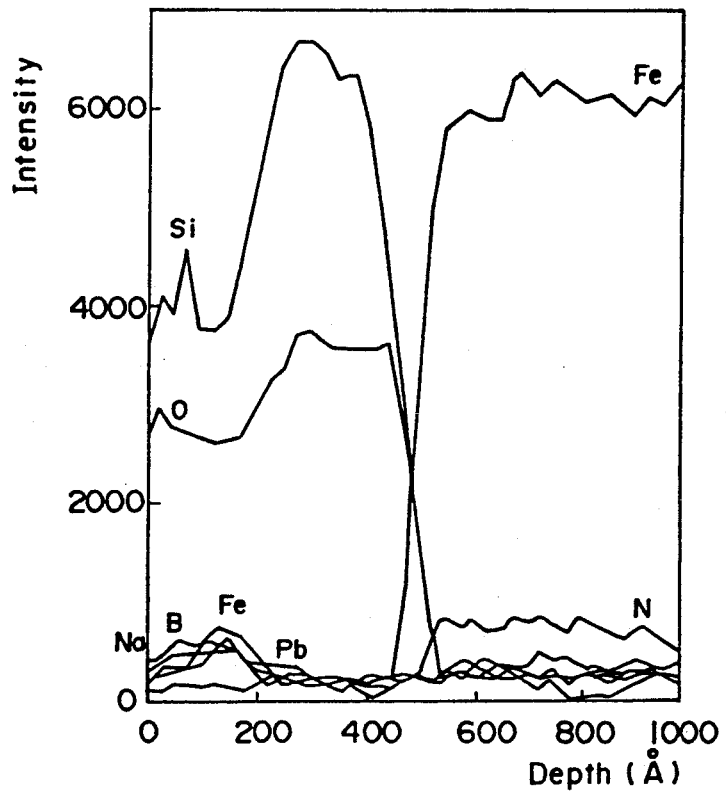
Figure 10A:
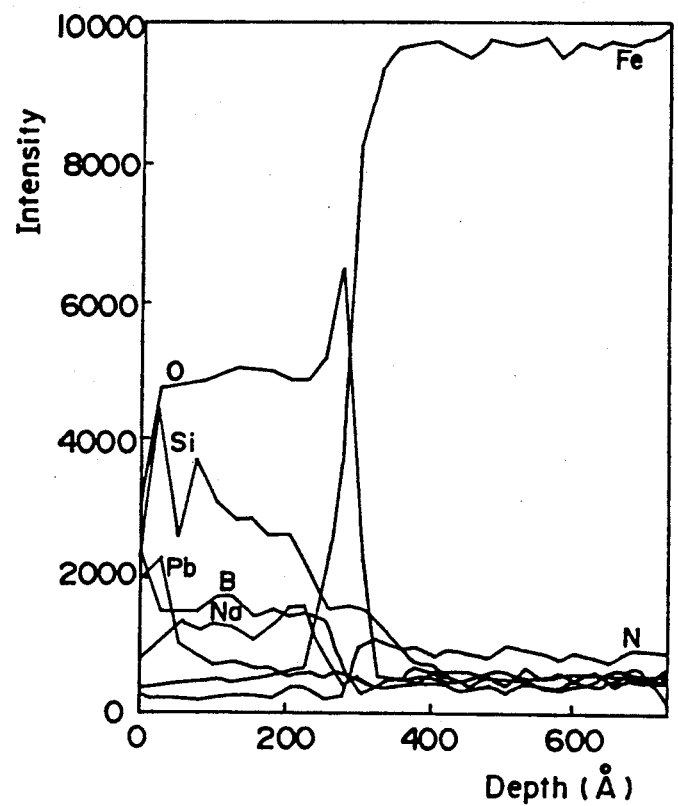
FIG. 10(A) is prior to the thermal treatment and FIG. 10(B) is after the thermal treatment.
Figure 10B:
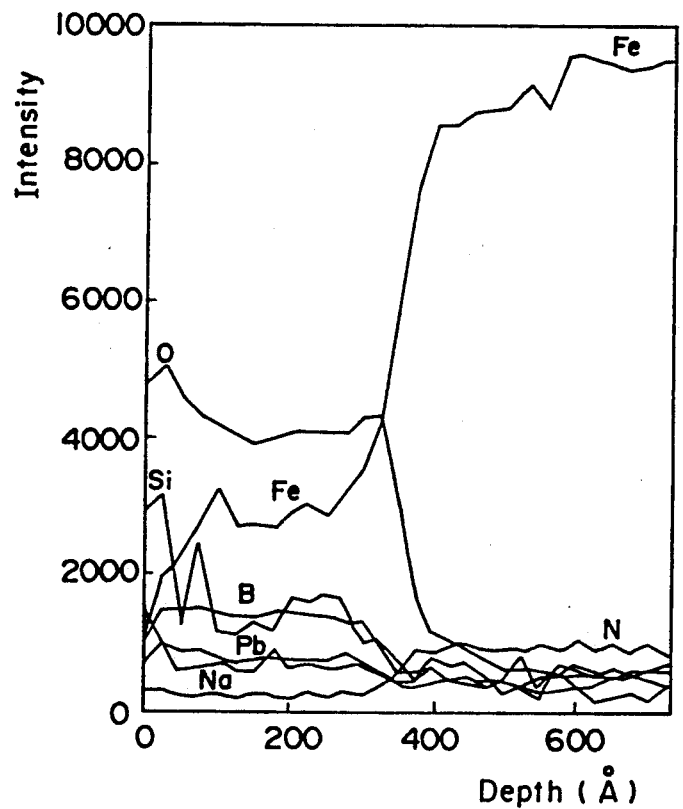

FIGS. 7(A) and 7(B), respectively, show compositional profiles of from the side of the fusing glass material to the side of the soft magnetic thin film in case where the reaction inhibiting film was a SiO$_2$ film (thickness 500 angstroms), wherein FIG. 10(A) is prior to the thermal treatment and FIG. 10(B) is after the thermal treatment.

As will be seen from these figures, the provision of the SiO$_2$ film scarcely permits Fe in the soft magnetic thin film to be diffused into the glass.

Figure 8A:
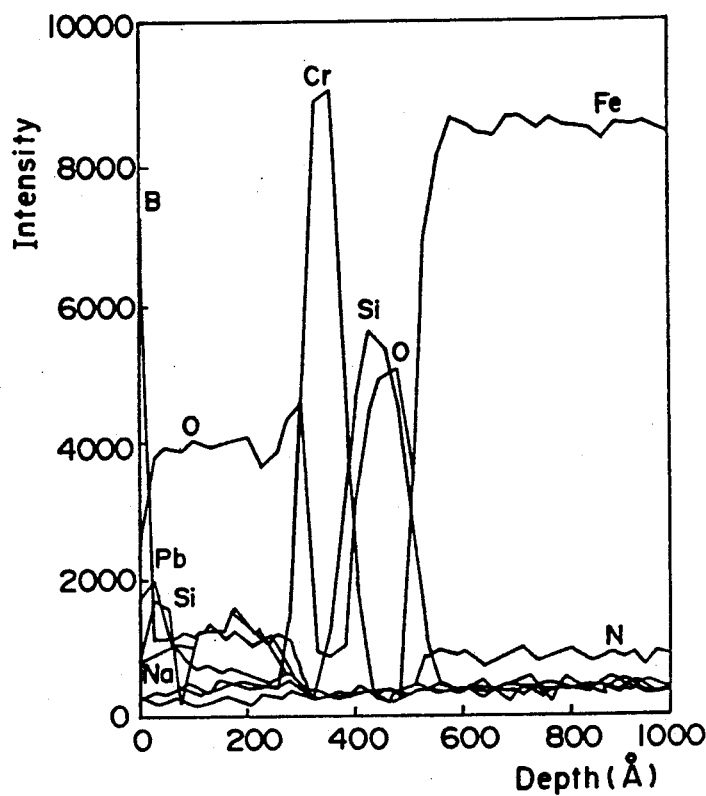
Figure 8B:
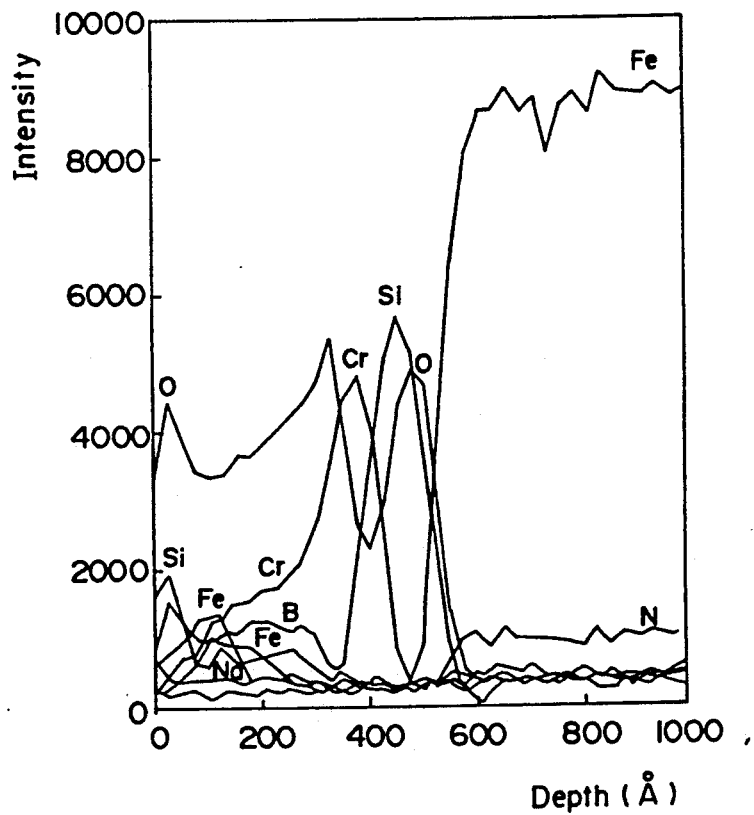

FIGS. 8(A) and 8(B), respectively, show compositional profiles in case where the reaction inhibiting film is an undercoat film (thickness 100 angstroms)+Cr film (thickness 100 angstroms), wherein FIG. 8(A) is prior to the thermal treatment and FIG. 8(b) is after the thermal treatment.

In this case, the Cr film forms a glass component (Cr$_2$O$_3$) after diffusion in the fusing glass material, but Fe in the soft magnetic thin film is not diffused in the glass. It will be noted that the diffusion of the Cr film in glass is a favorable phenomenon when taking the adhesion into consideration. By this, the bond strength between the soft magnetic thin film and the fusing glass material is ensured.

Figure 9A:
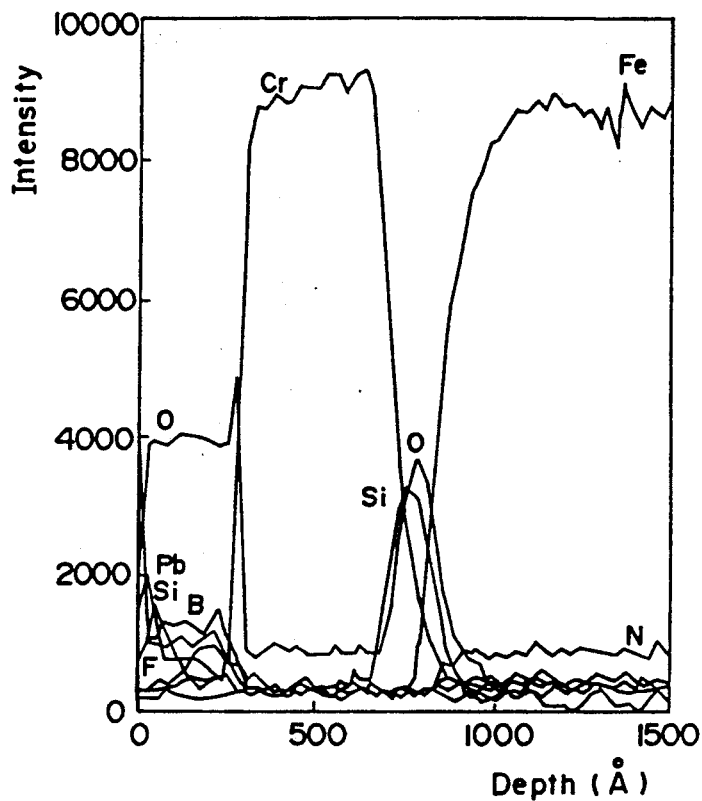
Figure 9B:
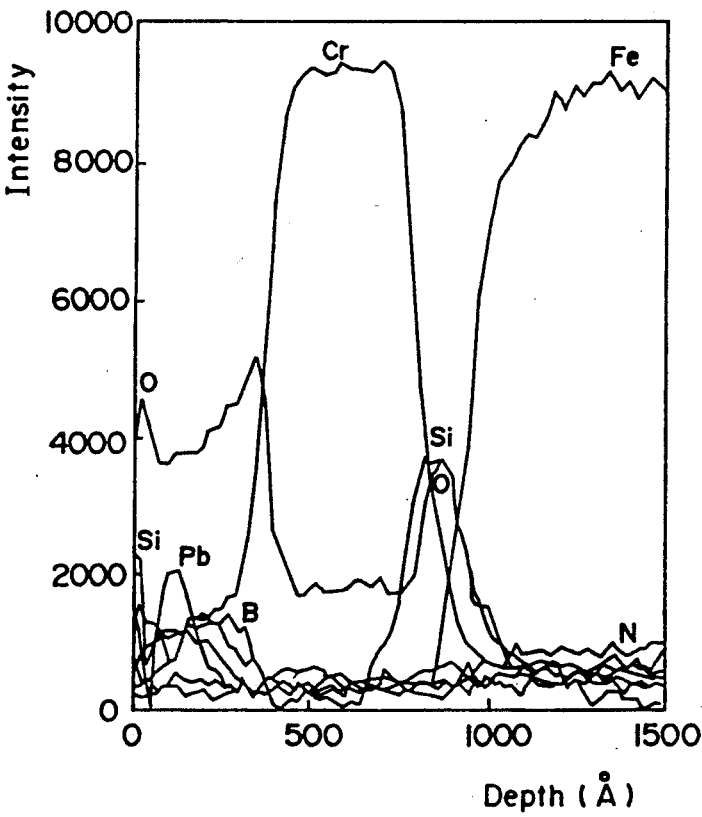

FIGS. 9(A) and 9(B), respectively, show compositional profiles prior to and after thermal treatment in case where the reaction inhibiting film is a SiO$_2$ undercoat film (thickness 100 angstroms)+Cr film (thickness 500 angstroms). In these cases, it is not found that Fe in the soft magnetic thin film is diffused.

FIGS. 10(A) and 10(B), respectively, compositional profiles prior to and after thermal treatment in case where a fusing glass material is directly sputtered on a soft magnetic thin film. When the soft magnetic thin film contacts the fusing glass material, Fe in the soft magnetic thin film is diffused into the glass, thereby forming Fe$_2$O$_3$.

A similar experiment was effected using a Si$_3$N$_4$ film instead of the SiO$_2$ film, with the result that Fe in the soft magnetic film was also suppressed from diffusion.

APPLICATION EXAMPLE 2

In this example, the interfacial reaction with ferrite was determined.

The composition of a soft magnetic thin film used herein was of the formula

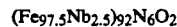

$(Fe_{97.5}Nb_{2.5})_{92}N_6O_2$ (sample IV in Table 1).

After formation of a SiO$_2$ film (thickness 100 angstroms) on a Mn-Zn ferrite core by sputtering, the soft magnetic thin film with the above composition was formed by sputtering in a thickness of 1000 angstroms.

Thereafter, the thermal treatment at 550° C. for 1 hour was performed, followed by checking how the reaction proceeds according to the Auger electron spectroscopy.

For comparison, the soft magnetic thin film was formed directly on the Mn-Zn ferrite core by sputtering, followed by thermal treatment at 550° C. for 1 hour to check how the reaction proceeds.

FIGS. 11(A) and 11(B), respectively, show compositional profiles of from the side of the soft magnetic thin film surface to the side of the ferrite core in case where a SiO$_2$ film (thickness 100 angstroms) was provided, as a reaction inhibiting film, between the ferrite core and the soft magnetic thin film, wherein FIG. 11(A) is prior to the thermal treatment and FIG. 11(B) is after the thermal treatment.

As will be apparent from these figures, the provision of the SiO$_2$ film can fully suppress the reaction between the ferrite and the soft magnetic thin film. When the thicknesses of the SiO$_2$ film were 30 angstroms and 50 angstroms, similar effects were confirmed.

Figure 12A:
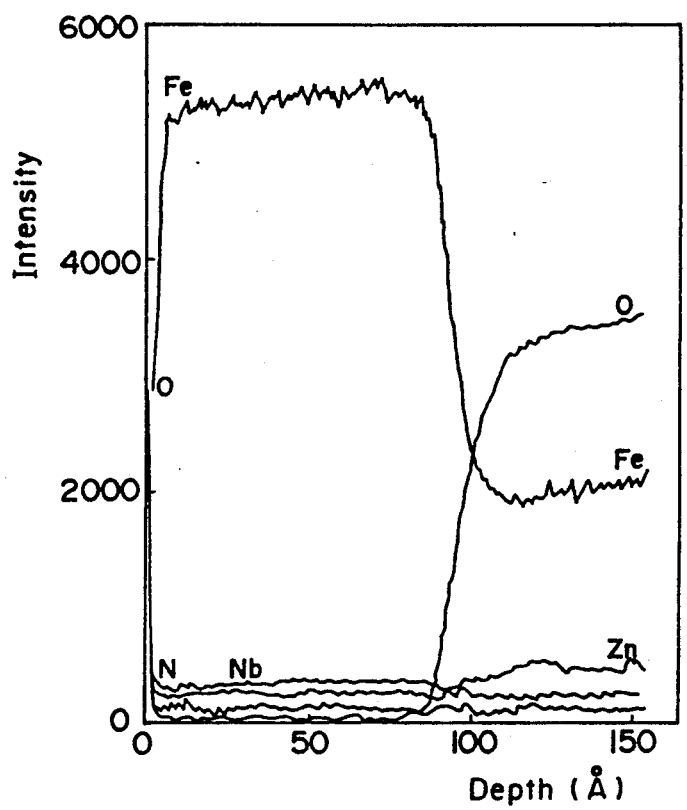
Figure 12B:
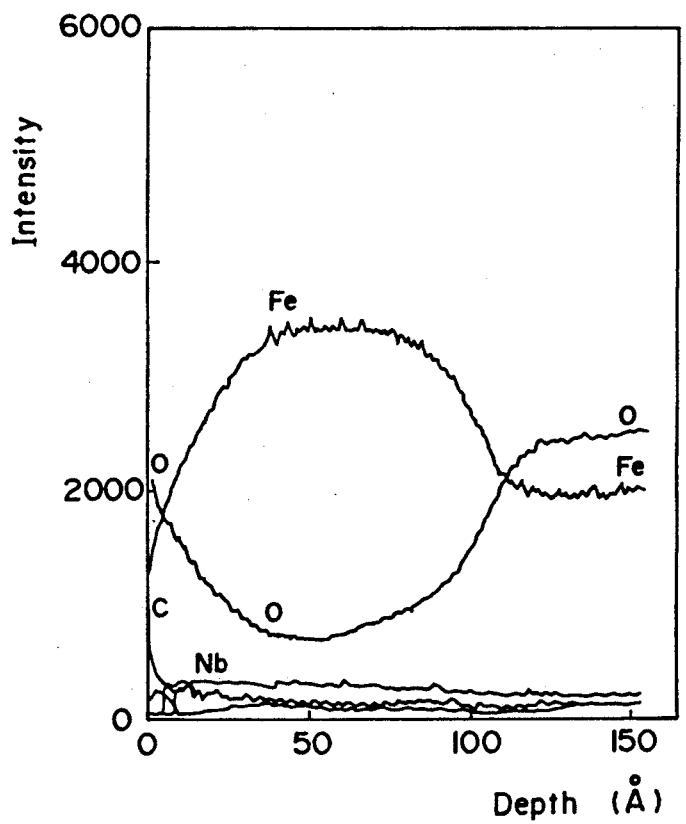

A similar test was performed using a Si$_3$N$_4$ film, with the result that the diffusion of oxygen in the ferrite could be suppressed.

Where the soft magnetic thin film was directly formed on the Mn-Zn ferrite core by sputtering, oxidation (diffusion of oxygen in the ferrite) from the side of the interface proceeds by the thermal treatment as shown in FIGS. 12(A) and 12(B).

In the above experiments, Fe-Nb-N-O films were tested and similar tests were carried out using soft magnetic thin films of the above composition to which Al or Ti was added, with similar results.

What is claimed is:

1. A soft magnetic thin film which consists essentially of a composition of the formula, $$(Fe_aM_b)_{100-c-d}N_cO_d$$

wherein M represents at least one element selected from the group consisting of Si, Al, Ta, B, Mg, Ca, Sr, Ba, Cr, Mn, Zr, Nb, Ti, Mo, V, W, Hf, Ga, Ge and rare earth elements, and a, b, c and d are, respectively, values by atomic % and are defined such that $0.1 \leq b \leq 5$, $a+b=100$, $0.5 \leq c \leq 15$ and $0.1 \leq d \leq 13$.

2. A soft magnetic thin film which consists essentially of a composition of the formula, $$(Fe_iM^I_jM^{II}_k)_{100-m-n}N_mO_n$$

wherein $M^I$ represents at least one element selected from the group consisting of Al, Ga, Ti and rare earth elements, and $M^{II}$ represents at least one element selected from the group consisting of Nb, Ta, V, Zr and Hf, and i, j, k, m and n are, respectively, values by atomic % and are defined such that $0.1 \leq j \leq 2.5$, $0.1 \leq k \leq 2.5$, $i+j+k=100$, $0.5 \leq m \leq 15$, and $0.1 \leq n \leq 13$.

3. A magnetic head which comprises a pair of magnetic core halves which are abutted to each other, each of the core halves including a magnetic ferrite block and a magnetic thin film defined in claim 1 or 2, which is provided on the ferrite block, the magnetic thin films formed on the respective ferrite blocks being in face-to-face and spaced relation with each other to establish a magnetic gap therebetween.

4. The magnetic head according to claim 3, wherein said core halves are bonded with a glass.

5. The magnetic head according to claim 4, further comprising a thin film of silicon oxide or silicon nitride provided, as a reaction inhibiting film, between the glass and the soft magnetic thin film and also between the ferrite block and the soft magnetic thin film of each core half.

6. The magnetic head according to claim 5, wherein reaction inhibiting film provided between the glass and the soft magnetic thin film is a built-up film consisting of a film of silicon oxide or silicon nitride and a film of metallic chromium or a chromium compound.

7. The magnetic head according to claim 5, wherein the reaction inhibiting thin film provided between the ferrite block and the soft magnetic thin film has a thickness of from 30 to 100 angstroms.

8. The magnetic head according to claim 5, wherein the reaction inhibiting thin film provided between the glass and the soft magnetic thin film has a thickness of from 30 to 500 angstroms.